United States Patent
Egan et al.

(10) Patent No.: US 9,977,261 B2
(45) Date of Patent: May 22, 2018

(54) FLUID-FILLED LENSES AND ACTUATION SYSTEMS THEREOF

(71) Applicant: Adlens Beacon, Inc., Pembroke Park, FL (US)

(72) Inventors: William Egan, Jackson, WY (US); Karim Haroud, Chavannes sur Moudon (CH); Lisa Nibauer, Short Hills, NJ (US); Matthew Peterson, San Francisco, CA (US); Urban Schnell, Münchenbuchsee (CH); Daniel Senatore, San Francisco, CA (US)

(73) Assignee: Adlens Beacon, Inc., Pembroke Park, FL (US)

( * ) Notice: Subject to any disclaimer, the term of this patent is extended or adjusted under 35 U.S.C. 154(b) by 0 days. days.

(21) Appl. No.: 15/682,050

(22) Filed: Aug. 21, 2017

(65) Prior Publication Data

US 2017/0371182 A1 Dec. 28, 2017

Related U.S. Application Data

(63) Continuation of application No. 14/718,635, filed on May 21, 2015, now Pat. No. 9,740,027, which is a continuation of application No. 13/293,814, filed on Nov. 10, 2011, now Pat. No. 9,042,027.

(60) Provisional application No. 61/411,978, filed on Nov. 10, 2010.

(51) Int. Cl.
*G02B 3/12* (2006.01)
*G02C 7/08* (2006.01)
*G02B 3/14* (2006.01)
*G02C 5/14* (2006.01)
*G02C 11/00* (2006.01)
*G02C 7/02* (2006.01)

(52) U.S. Cl.
CPC ............ *G02C 7/085* (2013.01); *G02B 3/14* (2013.01); *G02C 5/14* (2013.01); *G02C 7/022* (2013.01); *G02C 11/10* (2013.01)

(58) Field of Classification Search
CPC ............ G02B 3/14; G02B 3/12; G02C 7/085
See application file for complete search history.

(56) References Cited

U.S. PATENT DOCUMENTS

2010/0208195 A1* 8/2010 Gupta .................. G02B 3/14
351/159.68

* cited by examiner

*Primary Examiner* — Joseph P Martinez
(74) *Attorney, Agent, or Firm* — Greenberg Traurig, LLP

(57) ABSTRACT

An actuator assembly for an adjustable fluid-filled lens is provided. In some embodiments, the actuator assembly includes a clamp configured to adjust the optical power of the fluid lens module when the clamp is compressed. In some embodiments, a magnetic element is configured to adjust the optical power of the fluid-filled lens. In some embodiments, a plunger changes the optical power of the fluid lens module. In some embodiments, a reservoir is configured such that deformation of the reservoir changes the optical power of the fluid-filled lens. In some embodiments, a balloon is configured to deform the reservoir. In some embodiments, an adjustable fluid-filled lens includes a septum configured to be pierceable by a needle and automatically and fluidly seal a fluid chamber after withdrawal of the needle. In some embodiments, a thermal element can heat fluid within a fluid chamber to change an optical power of the lens module.

5 Claims, 25 Drawing Sheets

FLUID-FILLED LENSES AND ACTUATION SYSTEMS THEREOF

CROSS REFERENCE TO RELATED APPLICATIONS

This application claims the benefit of U.S. Provisional Patent Application No. 61/411,978 filed Nov. 10, 2010, which is hereby incorporated by reference in its entirety.

BACKGROUND

Field

Embodiments of the present invention relate to fluid-filled lenses, and in particular to variable fluid-filled lenses.

BACKGROUND

Basic fluid lenses have been known since about 1958, as described in U.S. Pat. No. 2,836,101, incorporated herein by reference in its entirety. More recent examples may be found in "Dynamically Reconfigurable Fluid Core Fluid Cladding Lens in a Microfluidic Channel" by Tang et al., Lab Chip, 2008, vol. 8, p. 395, and in WIPO publication WO2008/063442, each of which is incorporated herein by reference in its entirety. These applications of fluid lenses are directed towards photonics, digital phone and camera technology, and microelectronics.

Fluid lenses have also been proposed for ophthalmic applications (see, e.g., U.S. Pat. No. 7,085,065, which is incorporated herein by reference in its entirety). In all cases, the advantages of fluid lenses, such as a wide dynamic range, ability to provide adaptive correction, robustness, and low cost have to be balanced against limitations in aperture size, possibility of leakage, and consistency in performance. Power adjustment in fluid lenses has been effected by injecting additional fluid into a lens cavity, by electrowetting, application of ultrasonic impulse, and by utilizing swelling forces in a cross-linked polymer upon introduction of a swelling agent such as water.

The advantages of fluid lenses, such as a wide dynamic range, ability to provide adaptive correction, robustness, and low cost have to be balanced against limitations in aperture size, possibility of leakage, and consistency in performance.

BRIEF SUMMARY

In an embodiment, an actuator assembly for an adjustable fluid-filled lens includes a fluid lens module; a clamp surrounding the fluid lens module; a frame enclosing the clamp; and an actuator connected to an end of the clamp. In this embodiment, the actuator is accessible from outside the frame, the actuator is configured such that movement of the actuator relative to the frame causes the clamp to compress, and the clamp is configured to adjust the optical power of the fluid lens module when the clamp is compressed.

In another embodiment, an actuator assembly for an adjustable fluid-filled lens includes a temple piece having a hollow center fluidly connected to the adjustable fluid lens; fluid located within the hollow center; a magnetic slider slidably attached to the temple piece; and a magnetic element slidably disposed within the hollow center and magnetically coupled with the magnetic slider. In this embodiment, the magnetic element is configured such that movement of the magnetic element relative to the temple piece changes the optical power of the fluid-filled lens by increasing or decreasing an amount of fluid in the adjustable fluid-filled lens.

In another embodiment, an actuator assembly for an adjustable fluid-filled lens includes a fluid lens module; a temple piece having a hollow center fluidly connected to the fluid lens module; an actuator rotatably attached to the temple piece; a base disposed in the hollow center and coupled to the actuator; a cable including a first end connected to the base; and a plunger slidably disposed within the hollow center and connected to a second end of the cable. In this embodiment, the actuator is configured such that rotation of the actuator in a first direction relative to the temple piece causes the cable to wrap around the base and pull the plunger in a first direction, and the fluid lens module is configured such that movement of the plunger changes the optical power of the fluid lens module.

In another embodiment, an actuator assembly for an adjustable fluid-filled lens includes a fluid lens module; a housing including a hollow center fluidly connected to the fluid lens module; an actuator rotatably attached to the housing; and a plunger located within the hollow center and magnetically coupled to the actuator. In this embodiment, the plunger includes a threaded outer surface configured to engage with a threaded inner surface of the housing to allow for axial movement within the housing, the actuator is configured such that rotation of the actuator relative to the housing causes the plunger to rotate relative to the housing via magnetic force to advance in an axial direction within the housing, and the fluid lens module is configured such that movement of the plunger changes the optical power of the fluid lens module.

In another embodiment, an actuator assembly for an adjustable fluid-filled lens includes a fluid lens module; a temple piece including a hollow center having a bend therein; a reservoir disposed within the hollow center and fluidly connected to the fluid lens module; and a flexible pusher disposed within the hollow center. In this embodiment, the flexible pusher is configured to flex at the bend to compress the reservoir, and the reservoir is configured such that compression of the reservoir changes the optical power of the fluid-filled lens.

In another embodiment, an actuator assembly for an adjustable fluid-filled lens includes a temple piece including a hollow center; a reservoir located within the hollow center; and a wheel rotatably attached to the temple piece. In this embodiment, an axial face of the wheel includes protrusions configured to deform the reservoir as the wheel is rotated relative to the temple piece, and the reservoir is configured such that deformation of the reservoir changes the optical power of the fluid-filled lens.

In another embodiment, an actuator assembly for an adjustable fluid-filled lens includes a fluid lens module; a temple piece having a hollow center; a reservoir fluidly connected to the fluid lens module; and a pusher slidably disposed within the hollow center. In this embodiment, the pusher is configured to move in an axial direction relative to the temple piece to deform the reservoir and adjust the optical power of the fluid lens module, and the reservoir is configured to envelop the pusher as the pusher is moved against the reservoir.

In another embodiment, an actuator assembly for an adjustable fluid-filled lens includes a fluid lens module; a temple piece having a hollow center, a reservoir fluidly connected to the fluid lens module; an inflatable balloon adjacent to the reservoir; a pump connected to the balloon and configured to allow inflation of the balloon; and a pressure relief valve connected to the balloon and configured to allow deflation of the balloon. In this embodiment, the balloon is configured such that inflation or deflation of the balloon deforms the reservoir, and the reservoir is configured such that deformation of the reservoir changes the optical power of the fluid lens.

In another embodiment, an actuator assembly for an adjustable fluid-filled lens includes a fluid lens module; a temple piece having a hollow center; a reservoir disposed in the hollow center and fluidly connected to the fluid lens module; a duckbill valve disposed in the hollow center and configured to allow for the introduction of air to deform the reservoir; and a pressure release valve connected to the hollow center and configured to allow for the removal of pressurized air in the hollow center to deform the reservoir. In this embodiment, the reservoir is configured such that deformation of the reservoir changes the optical power of the fluid lens.

In another embodiment, an adjustable fluid-filled lens includes a fluid chamber; a frame surrounding the fluid chamber, and a septum disposed within the frame and fluidly connected to the fluid chamber. In this embodiment, the septum is configured to be pierceable by a needle and automatically and fluidly seal the fluid chamber after withdrawal of the needle.

In another embodiment, an adjustable fluid lens module includes a fluid chamber containing fluid; and a thermal element configured to heat the fluid. In this embodiment, when the fluid is heated, the fluid expands and deforms the shape of the fluid chamber to change the optical power of the fluid lens module.

Further embodiments, features, and advantages of the present invention, as well as the structure and operation of the various embodiments of the present invention, are described in detail below with reference to the accompanying figures.

BRIEF DESCRIPTION OF THE DRAWINGS/FIGURES

The accompanying drawings, which are incorporated herein and form a part of the specification, illustrate embodiments of the present invention and, together with the description, further serve to explain the principles of the invention and to enable a person skilled in the pertinent art to make and use the invention.

Embodiments of the present invention will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other optical applications.

It is noted that references in the specification to "an embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

Although 20/20 vision, which corresponds to an image resolution of 1 minute of arc ($\frac{1}{60}$ degree) is generally acknowledged to represent an acceptable quality of vision, the human retina is capable of finer image resolution. It is known that a healthy human retina is capable of resolving 20 seconds of arc ($\frac{1}{300}$ degree). Corrective eyeglasses designed to enable a patient to achieve this superior level of vision have a resolution of about 0.10 D or better. This resolution can be achieved with some embodiments of fluid filled lenses and actuation systems of the present invention.

Clamp Actuator Embodiments

Figure 1:
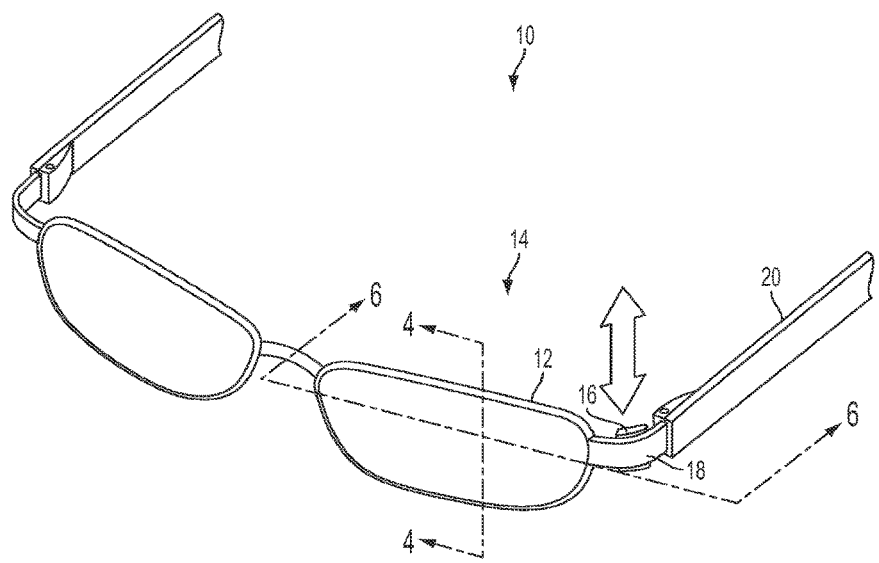
FIG. 1 illustrates a perspective view of an embodiment of an eyeglass assembly.

FIG. 1 illustrates a front perspective view of an eyeglass assembly 10 in accordance with an embodiment of the present invention. Eyeglass assembly 10 includes a frame 12, fluid lens module 14, actuator 16, connecting arm 18, and temple piece (or arm) 20. In operation, when actuator 16 is moved in and up-and-down direction relative to connecting arm 18, the shape of fluid lens module 14 is changed. As the shape of fluid lens module 14 is changed, the optical power of fluid lens module 14 is changed. This operation is described further with respect to FIGS. 2-7 below.

Figure 2:
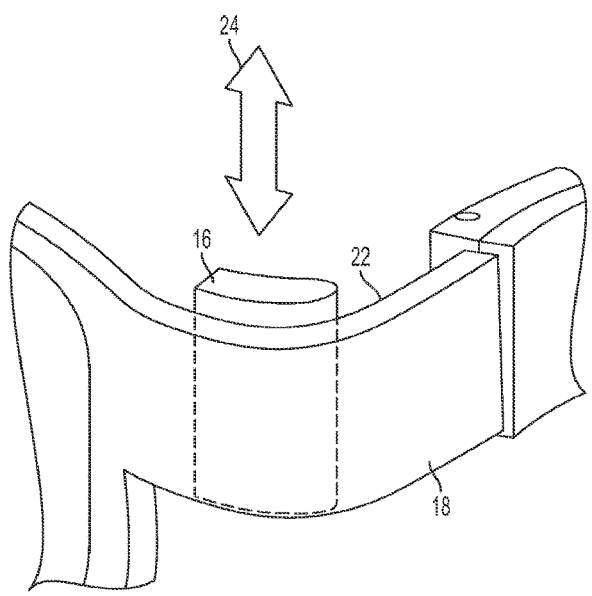
FIG. 2 illustrates a perspective view of a portion of the eyeglass assembly of FIG. 1.

FIG. 2 illustrates an enlarged view of connecting arm 18 and actuator 16. In an embodiment, actuator 16 is substantially rectangular and is slidably coupled with connecting arm 18. In an embodiment, actuator 16 is disposed on an outside surface 22 of connecting arm 18. In other embodiments, actuator 16 passes through connecting arm 18. As shown by arrow 24, in an embodiment, actuator 16 can move in an up-and-down direction with respect to connecting arm 18. In another embodiment, actuator 16 can be moved horizontally with respect to connecting arm 18 or can twist relative to connecting arm 18. In an embodiment, the actuator is accessible from outside the frame. For example, as shown in FIG. 1, actuator 16 can extend beyond the edges of connecting arm 18 so that it is visible above and below connecting arm 18. In other embodiments, actuator 16 can extend beyond connecting arm 18 in only a single direction.

Figure 3:
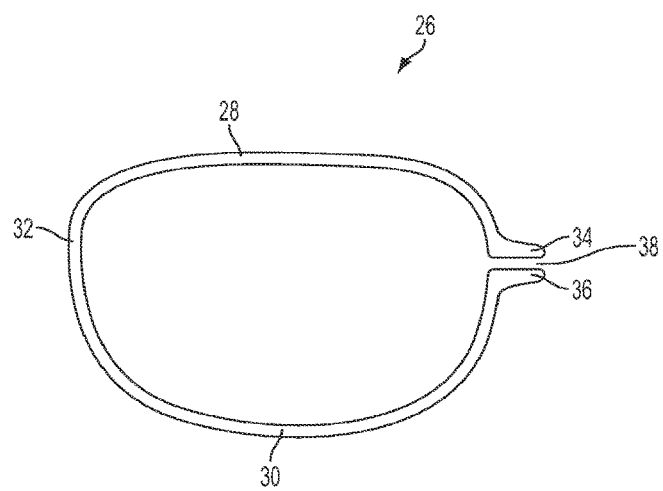
FIG. 3 illustrates a front view of a clamp of the eyeglass assembly of FIG. 1.

FIG. 3 illustrates a front view of a clamp 26 of fluid lens module 14. Clamp 26 includes a first portion 28 and a second portion 30 connected by a hinge 32. First portion 28, second portion 30, and hinge 32 may all be different sections of a lens frame. First end 34 is located on a distal end of first portion 28 and second end 36 is located on a distal end of second portion 30. Gap 38 is located between first end 34 and second end 36 to allow the ends to move towards or away from each other. In an embodiment, as actuator 16 is moved in a first direction, actuator 16 moves one or more portions of clamp 26 to increase the width of gap 38. As actuator 16 is moved in a second direction, actuator 16 moves one or more portions of clamp 26 to decrease the width of gap 38.

As shown in FIG. 3, clamp 26 can be shaped substantially similarly to frame 12 of eyeglass assembly 10. This shape can allow for hinge 32 to provide a restoring force via plastic or metallic bending. In other embodiments, hinge 32 can allow for relative movement between first end 34 and second end 36 without providing a restoring force. In an embodiment, first portion 28 and second portion 30 of clamp 26 are not directly connected. Instead, for example, first portion 28 can form its own hinge via attachment to frame 12 or another portion of eyeglass assembly 10, rather than through attachment to second portion 30. In an embodiment, both first portion 28 and second portion 30 move relative to frame 12. In other embodiments, only one of first portion 28 and second portion 30 moves relative to eyeglass assembly 10, the other portion being fixed relative to eyeglass assembly 10. The location of first end 34 relative to second end 36 can be fixed in a desired position, via the use of a detent or ratchet lock (not shown), which can be released by applying suitable force to one or both of the ends.

Figure 4:
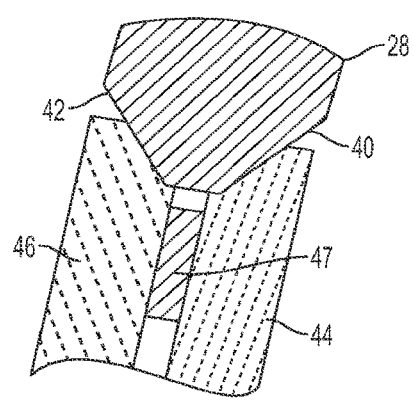
FIG. 4 illustrates a cross-sectional view of a portion of an eyeglass assembly along line 4-4 of FIG. 1.

FIG. 4 illustrates a cross-sectional view of a portion of fluid lens module 14 along line 4-4. First portion 28 includes a first wedged end 40 and a second wedged end 42. First wedged end 40 engages with deformable membrane 44 so that when first portion 28 is moved up and down, first wedged end 40 changes the shape of membrane 44.

Membrane 44 can be made of a flexible, transparent, water impermeable material, such as, for example and without limitation, clear and elastic polyolefins, polycycloaliphatics, polyethers, polyesters, polyimides and polyurethanes, for example, polyvinylidene chloride films. Other polymers suitable for use as membrane materials include, for example and without limitation, polysulfones, polyurethanes, polythiourethanes, polyethylene terephthalate, polymers of cycloolefins and aliphatic or alicyclic polyethers. Membrane 44 can be made of a biocompatible impermeable material, such as a cyclo-aliphatic hydrocarbon. In an embodiment, the thickness of the membrane can range between 3 to 10 microns.

As the shape of membrane 44 is changed, the optical power of fluid lens module 14 is adjusted. In one embodiment, first wedged end 40 directly pushes on membrane 44 to deform membrane 44. In another embodiment, movement of wedged end 40 increases or decreases pressure within the lens cavity, causing membrane 44 to deform accordingly. In an embodiment, membrane 44 can be sized or shaped to bend in one or more predetermined bending configurations. For example, when actuator 16 is moved to a first position, membrane 44 can be deformed into a predetermined first configuration corresponding to a first desired optical power. When actuator 16 is moved to a second position, membrane 44 can be deformed into a predetermined second configuration corresponding to a second desired optical power.

Additionally or alternatively, a thickness of membrane 44 can be contoured so as to effect a spherical or other predetermined deformation of membrane 44. For example, in an embodiment, membrane 44 includes an inset portion that is more flexible than other portions of membrane 44, such that deformation of membrane 44 causes the shape of the inset portion to change in a spherical manner without substantially changing portions of membrane 44 other than the inset portions.

As shown in FIG. 4, second wedged end 42 engages with a first rigid lens 46. Lens module 14 can further include a seal 47 between first rigid lens 46 and membrane 44. The rigid lenses described herein can be made of glass, plastic, or any other suitable material. Other suitable materials include, for example and without limitation, Diethylglycol bisallyl carbonate (DEG-BAC), poly(methyl methacrylate) (PMMA), and a proprietary polyurea complex, trade name TRIVEX (PPG). One or more of the lenses described herein can be made of a conventional soft lens material, such as silicone hydrogel cross-linked polymer having a refractive index from 1.42 to 1.46. The lenses can be made of an impact resistant polymer and can have a scratch resistant coating or an antireflective coating.

In some embodiments, first portion 28 can include other suitable shapes in order to deform membrane 44 instead of the wedged ends shown in FIG. 4. For example, one side of first portion 28 can be wedged and the other side can be substantially vertical or curved.

Figure 5:
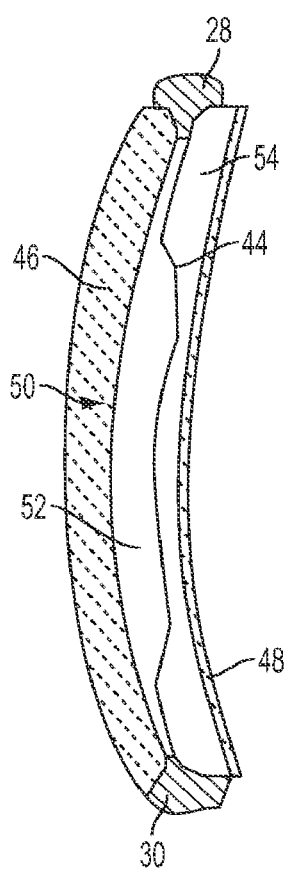
FIG. 5 illustrates a cross-sectional view of another portion of an eyeglass assembly along line 4-4 of FIG. 1.

FIG. 5 illustrates a cross-sectional view of a portion of fluid lens module 14 along line 4-4. Fluid lens module 14 includes first rigid lens 46 and second rigid lens 48 separated by first portion 28 and second portion 30. First rigid lens 46 and membrane 44 are configured to form a lens chamber 50 therebetween containing a first fluid 52. A second fluid 54 can likewise be contained between membrane 44 and second rigid lens 48. The fluid used in fluid lens module 14 can be a colorless fluid, for example air or distilled water. Other embodiments can include fluid that is tinted, depending on the application. One example of fluid that can be used is manufactured by Dow Corning of Midland, Mich., under the name "diffusion pump oil," which is also generally referred to as "silicone oil." In some embodiments, the fluid can be an aliphatic polysiloxane having a refractive index matching the lens material. First fluid 52 and second fluid 54 can be the same. Alternatively, the fluids can be different, for example first fluid 52 can be silicone oil and second fluid 54 can be air. In an embodiment, membrane 44 is fluidly sealed to first rigid lens 46 as well as to second rigid lens 48. Membrane 44 can be sealed to one or both rigid lenses 46, 48 by any suitable method, such as adhesive, ultrasonic welding, heat sealing, laser welding, or any similar process. One or more of membrane 44, first rigid lens 46 and second rigid lens 48 can be at least in part bonded to a support element that is in turn bonded to frame 12. Membrane 44 can be substantially flat when sealed but can be thermoformed to a specific curvature or spherical geometry. In some embodiments, one or more of membrane 44, first rigid lens 46, second rigid lens 48, first fluid 52, and second fluid 54 can have the same refractive index.

The example shown in FIG. 5 does not require a separate fluid reservoir for fluid lens module 14. In alternative embodiments, a reservoir can be included in eyeglass assembly 10, such as in clamp 26 or in temple piece (or arm) 20 to provide or store additional fluid. In such an embodiment, fluid lens module 14 can include a conduit to provide for fluid flow between the reservoir and the lens chamber 50.

Figure 6:
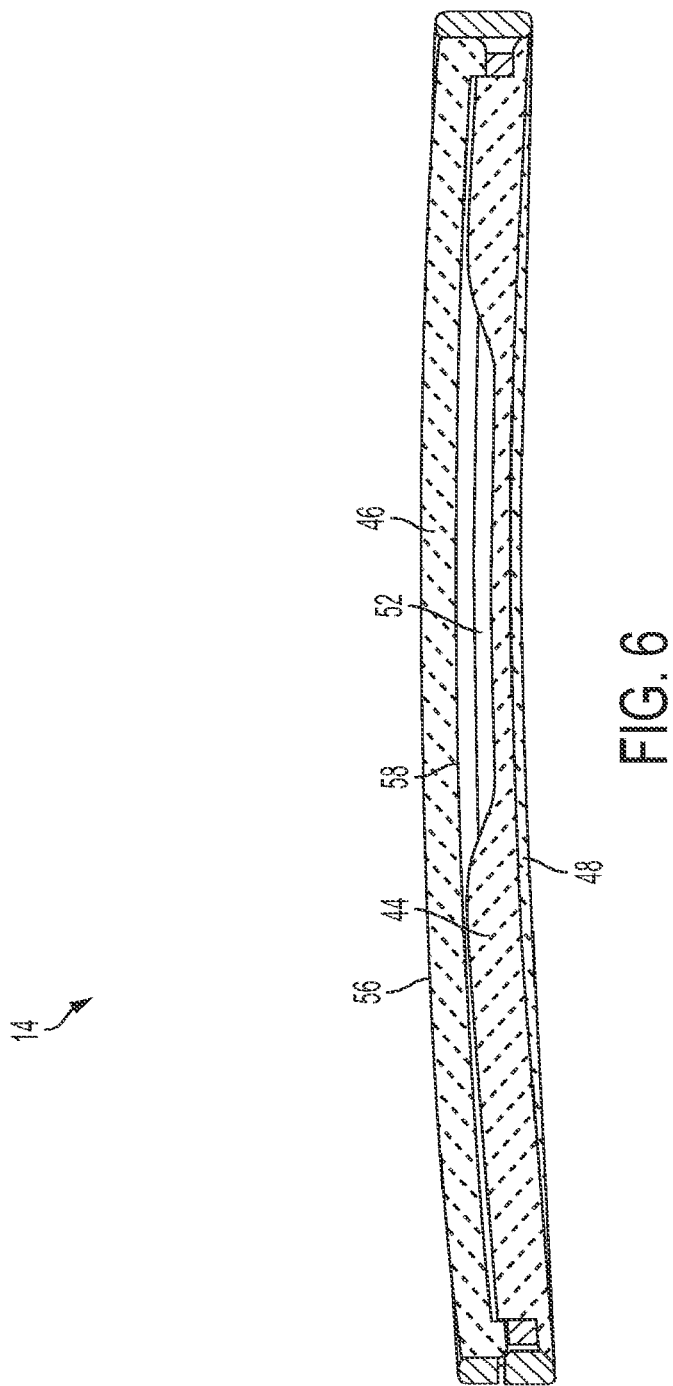
FIG. 6 illustrates a cross-sectional view of a portion of an eyeglass assembly of FIG. 1 along line 6-6 in a first configuration.
Figure 7:
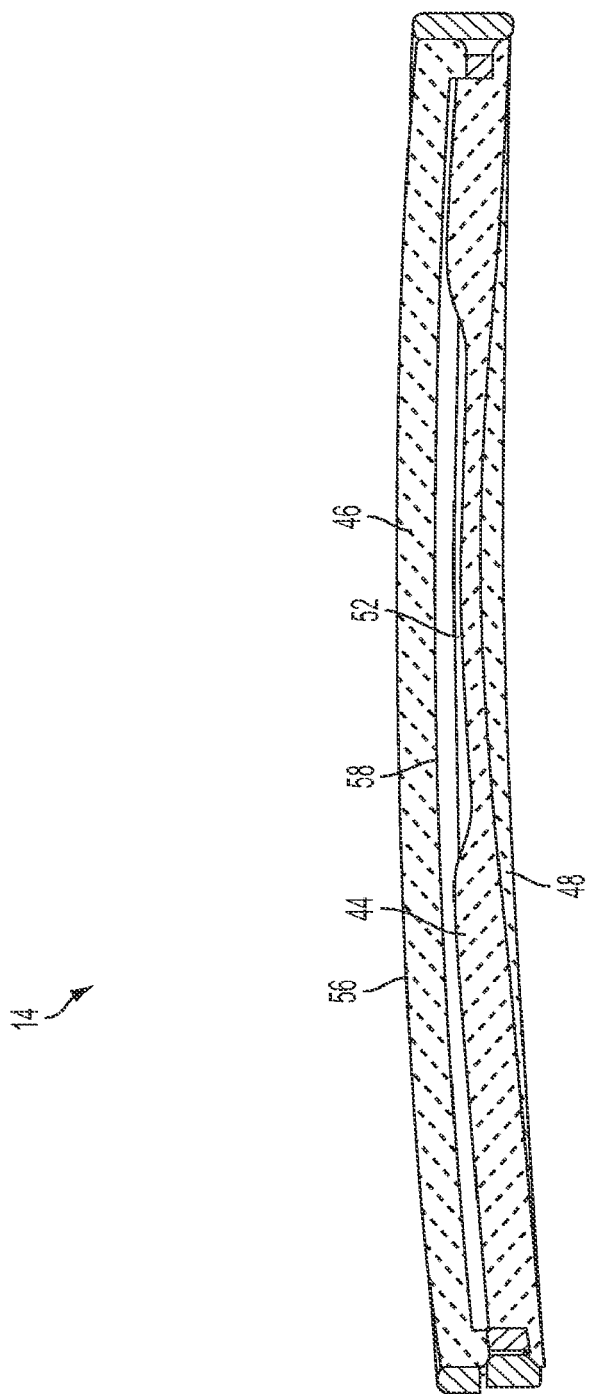
FIG. 7 illustrates a cross-sectional view of a portion of an eyeglass assembly of FIG. 1 along line 6-6 in a second configuration.

FIG. 6 illustrates a cross-sectional view of a portion of fluid lens module 14 along line 6-6 in which membrane 44 is deformed in a first configuration. In this embodiment, membrane 44 is pressed against second rigid lens 48 and extends therefrom so that only one fluid lens is formed in fluid lens module 14. FIG. 7 illustrates a cross-sectional view of a portion of fluid lens module 14 along line B-B in which membrane 44 is deformed in a second configuration. As described above, the deformation shapes can correspond to desired optical powers.

In an embodiment, the deformation of fluid lens module 14 can produce a non-spherical deflection. To counteract this, the front and/or back surfaces of first and/or second rigid lenses 46, 48 can be aspherical to correct for any astigmatism created by the deflection. For example, in an embodiment, a front surface 56 of first rigid lens 46 can counteract astigmatism caused by deformation, whereas in another embodiment, a back surface 58 can counteract the deformation. In some embodiments, front surface 56 is spherical and can have the same curve across its entire surface. In an embodiment, back surface 58 is aspheric and has a more complex front surface curvature that gradually changes from the center of the lens out to the edge, so as to provide a slimmer profile and a desired power profile as a function of the gaze angle, the gaze angle being defined herein as the angle formed between the actual line of sight and the principal axis of fluid lens module 14.

In an embodiment, front surface 56 of first rigid lens 46 has a meniscus shape, i.e., convex at its front side and concave at its back side. Thus, both the front and the back surfaces 56, 58 are curved in the same direction. Back surface 58 can be thicker in the center and thinner at the edge, i.e., the radius of curvature of front surface 56 is smaller than the radius of curvature of back surface 58.

In some embodiments of an eyeglass assembly 10, one or both left and right lenses are provided with their own lens module and/or actuation system, so that a lens for each eye can be adjusted independently. An embodiment of this configuration can allow wearers, such as anisometropic patients, to correct any refractive error in each eye separately, so as to achieve appropriate correction in both eyes, which can result in better binocular vision and binocular summation.

In some embodiments, a fluid lens module 14 can be adjusted continuously over a desired power range by the wearer. An embodiment of this configuration can allow a user to adjust the power to precisely match the refractive error for a particular object distance in a particular light environment to compensate for alteration of the natural depth of focus of the eye that depends on the wearer's pupil size. In some embodiments, fluid lens module 14 can alternatively or additionally be used to provide image magnification outside the physiological range of human vision.

In some embodiments, fluid lens module 14 can include separate lens regions that provide differing optical properties. For example, a first region can correct for near-sightedness, whereas a second region can correct for far-sightedness. Alternatively, one or both of the regions can provide little to no optical correction. In another embodiment, the separate regions are separated by a gradual change in optical properties.

Magnetic Actuator Embodiments

Figure 8:
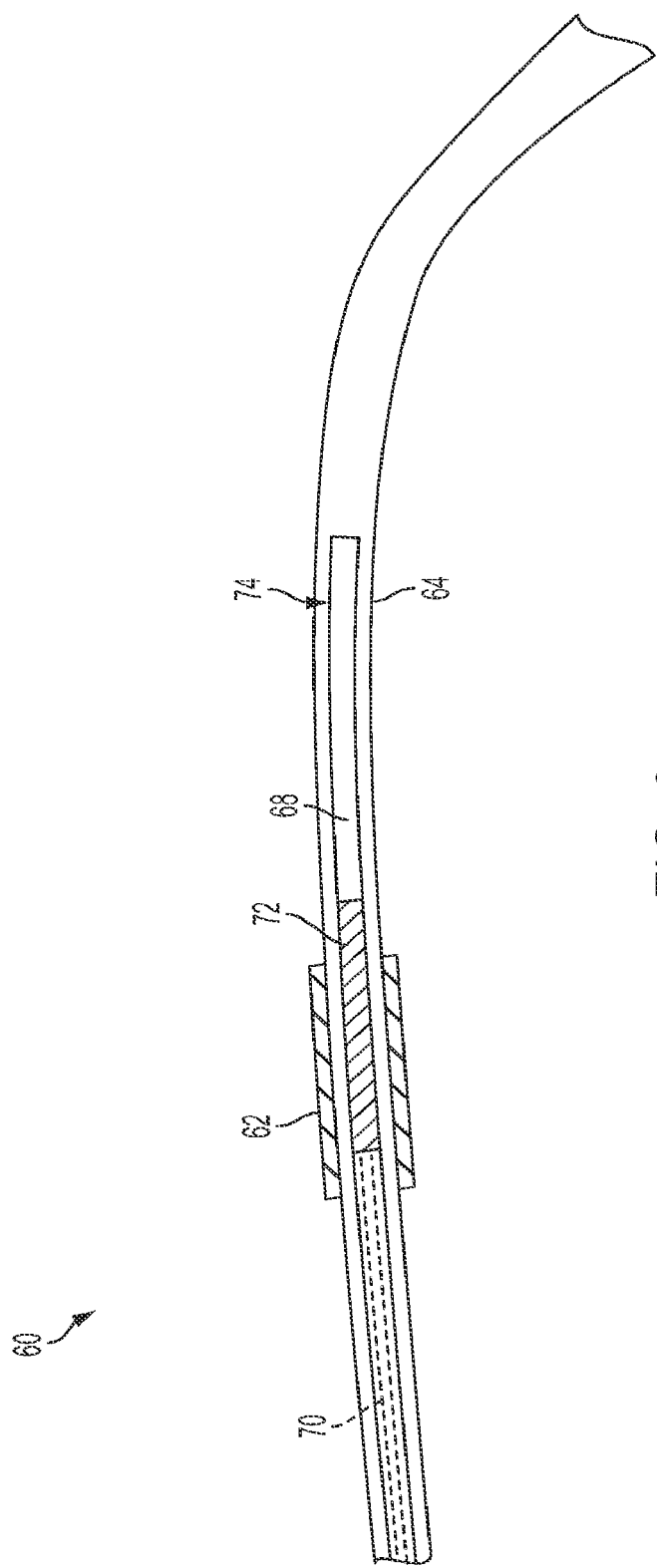
FIG. 8 illustrates a cross-sectional view of an embodiment of a magnetic actuator assembly.
Figure 9:
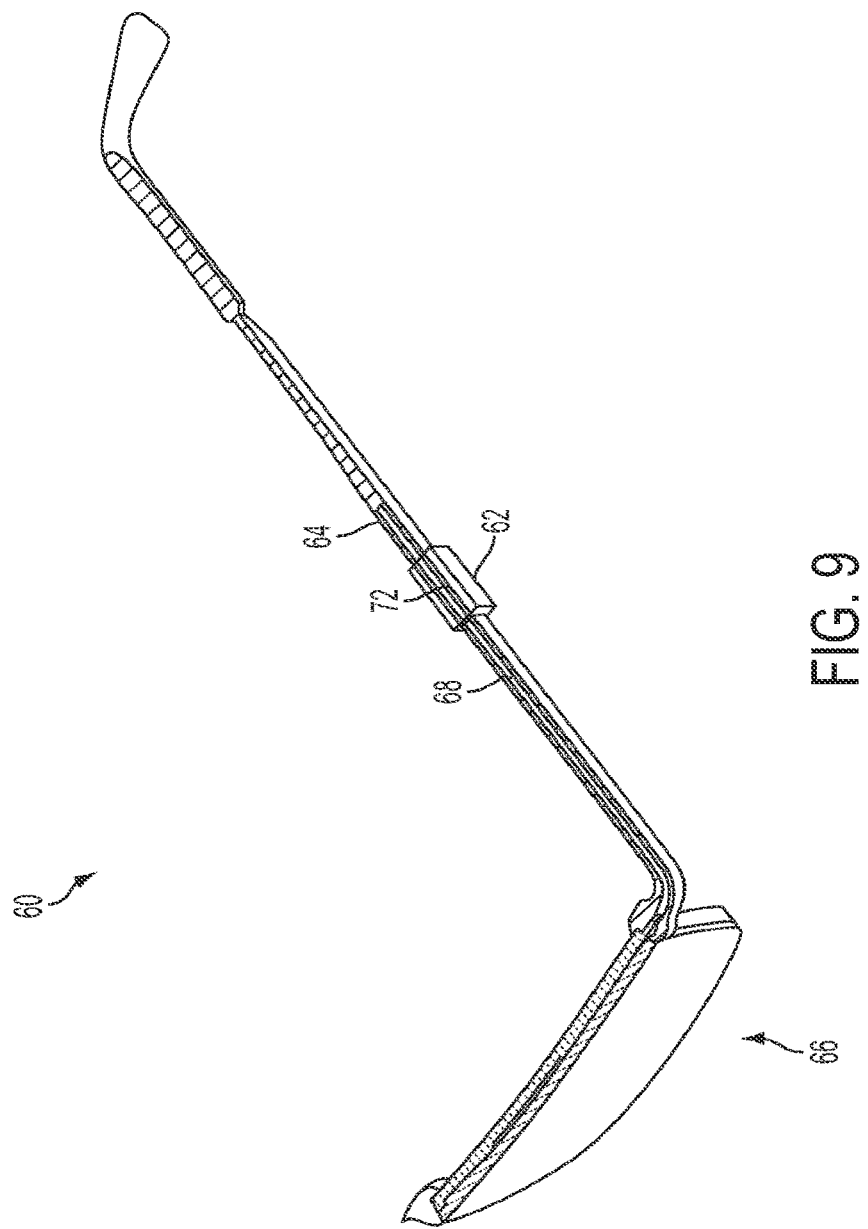
FIG. 9 illustrates a cross-sectional view of the magnetic actuator assembly of FIG. 8.

FIGS. 8 and 9 illustrate cross-sectional views of a magnetic actuator assembly 60 in accordance with an embodiment of the invention. Magnetic actuator assembly 60 includes magnetic slider 62 slidably disposed on temple piece 64. Temple piece 64 is attached to a fluid lens module 66 and includes a hollow center 68 in which fluid 70 and magnetic element 72 are disposed. In an embodiment, magnetic element 72 is a solid magnet such as a cylinder or bar magnet slidably disposed within hollow center 68. In this embodiment, hollow center 68 substantially conforms to the shape of magnetic element 72 in order to provide a substantial fluid seal between magnetic element 72 and temple piece 64. In operation, as magnetic slider 62 is moved relative to temple piece 64 (for example, left or right as shown in FIG. 8), magnetic slider 62 exerts a force on magnetic element 72 to move magnetic element 72. As magnetic element 72 is moved, it acts as a piston to push or pull fluid 70 into or out of fluid lens module 66. In some embodiments, magnetic element 72 moves in the same direction as magnetic slider 62; in other embodiments, magnetic element 72 moves in a different direction from magnetic slider 62.

In an embodiment, magnetic element 72 is a ferrofluid. Suitable ferrofluids can include liquids including nanoscale ferromagnetic or ferromagnetic particles suspended in a carrier fluid, such as an organic solvent or water. As a result, the ferrofluid can become strongly magnetized in the presence of a magnetic field. In some embodiments, the ferrofluid is non-miscible with fluid 70, which allows it to act like a plunger to move fluid 70 into and out of a fluid lens module. For example, like the embodiment described above, as magnetic slider 62 is moved relative to temple piece 64, ferrofluid magnetic element 72 pushes or pulls fluid 70 into or out of fluid lens module 66. In some embodiments, ferrofluid magnetic element 72 completely seals the area of hollow center 68. In some embodiments, a distal portion 74 of temple piece 64 can include an opening to allow for airflow within hollow center 68. One benefit of using a ferrofluid magnetic element 72 is that that in some embodiments it does not require a physical connection between magnetic slider 62 and magnetic element 72. As a result, temple piece 64 can be completely sealed, thus reducing the likelihood of leaking fluid 70. In an embodiment, for example, temple piece 64 is configured to fully enclose and seal the hollow center 68.

Figure 10:
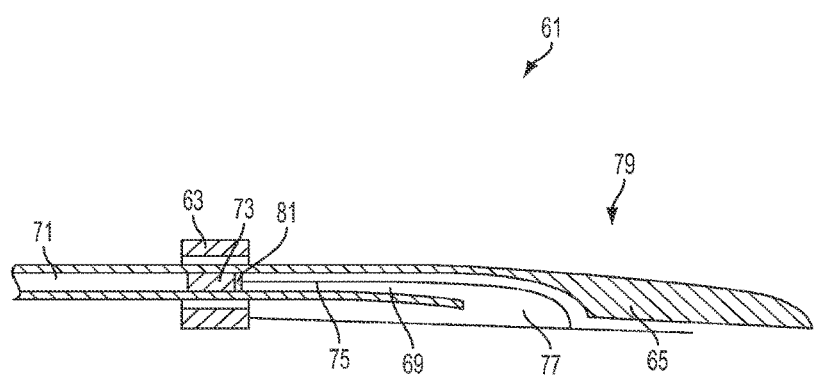
FIG. 10 illustrates a cross-sectional view of an embodiment of a magnetic actuator assembly.

FIG. 10 illustrates a cross-sectional view of a magnetic actuator assembly 61 in accordance with an embodiment of the invention. Like magnetic actuator assembly 60 described above, magnetic actuator assembly 61 includes a magnetic slider 63 slidably disposed on temple piece 65. Temple piece 65 is attached to a fluid lens module (not shown) and includes a hollow center 69 in which fluid 71 and magnetic element 73 are disposed. Magnetic actuator assembly 61 additionally includes a pusher arm 75 physically attached to both magnetic slider 63 and magnetic element 73. In an embodiment, pusher arm 75 can provide additional axial force to push and pull magnetic element 73. In an embodiment, pusher arm 75 can include a flat pusher end 81 having dimensions conforming to the inner surface of temple piece 65. In particular, when magnetic element 73 is a ferrofluid, pusher arm 75 can provide force in an axial direction while the ferrofluid creates a seal within hollow center 69. In an embodiment, pusher arm 75 is magnetic and magnetically coupled to magnetic element 73 to facilitate movement of magnetic element 73. In an embodiment, a distal portion 79 of temple piece 65 includes an aperture 77 to allow airflow between an outside surface of temple piece and hollow center 69.

Screw Actuator Embodiments

Figure 11:
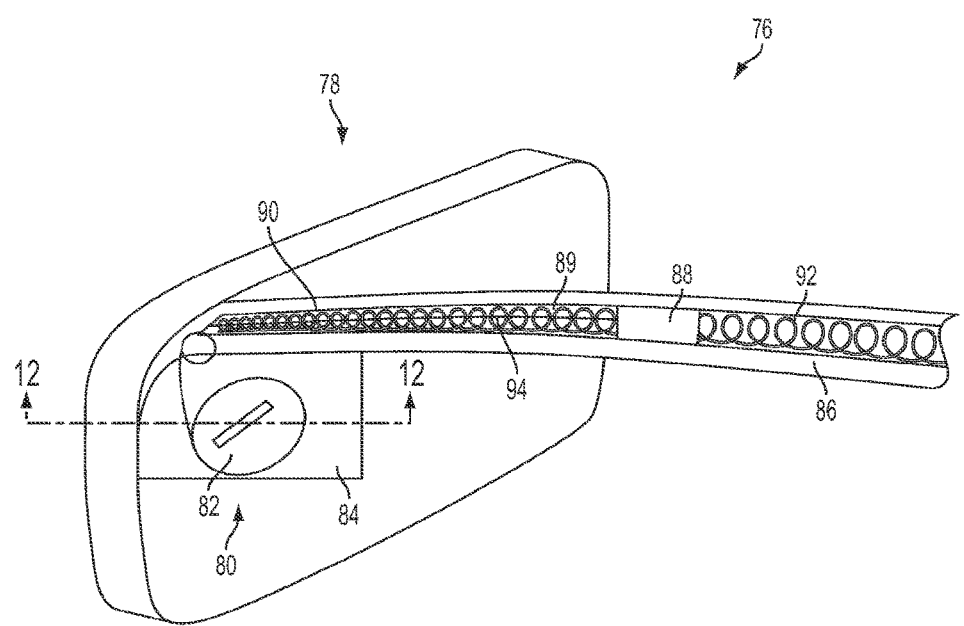
FIG. 11 illustrates a partially transparent view of an embodiment of an eyeglass assembly.

FIG. 11 illustrates a partially transparent view of an eyeglass assembly 76 in accordance with another embodiment of the invention. Eyeglass assembly 76 includes a fluid lens module 78, magnetic actuator assembly 80, including actuator 82 which is rotatably attached to temple piece 86, and a housing 84 fluidly sealed to temple piece 86 to prevent leakage of fluid 89. Magnetic actuator assembly 80 is connected to a plunger 88 via a cable 90.

Figure 12:
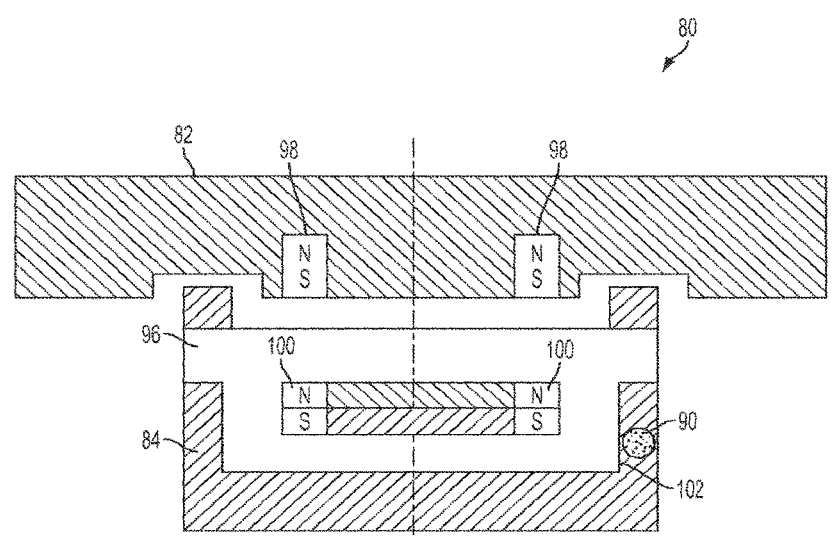
FIG. 12 illustrates a cross-sectional view of an embodiment of a magnetic actuator assembly of the eyeglass assembly of FIG. 11 along line 12-12.

FIG. 12 illustrates a cross-sectional view of magnetic actuator assembly 80 along line 12-12. Magnetic actuator assembly 80 includes actuator 82 and a base 96. In an embodiment, base 96 is sized to fluidly seal housing 84. Each of actuator 82 and base 96 include one or more magnets 98, 100 fixed thereon. Actuator 82 is magnetically coupled to base 96 via magnet 98 and magnet 100. Base 96 is attached to cable 90 at step 102 such that when base 96 is rotated in a first direction (for example counter-clockwise, as shown in FIG. 11) cable 90 is wrapped around step 102. As cable 90 is wrapped around step 102, plunger 88 is pulled towards magnetic actuator assembly 80. Likewise, when base 96 is rotated in a second direction (for example clockwise), cable 90 is unwrapped from step 102. Magnetic actuator assembly 80 includes one or more springs 92, 94 that provide a force to bias the plunger in a predetermined position as cable 90 is unwrapped. In certain embodiments, cable 90 can be rigid, such that as cable 90 is unwrapped from step 102, it pushes plunger 88 in a distal direction. In another embodiment, actuator 82 is not magnetically coupled to base 96. Instead, actuator 82 is physically coupled to base 96. In some embodiments, actuator 82 is both magnetically and physically coupled to base 96.

Figure 13:
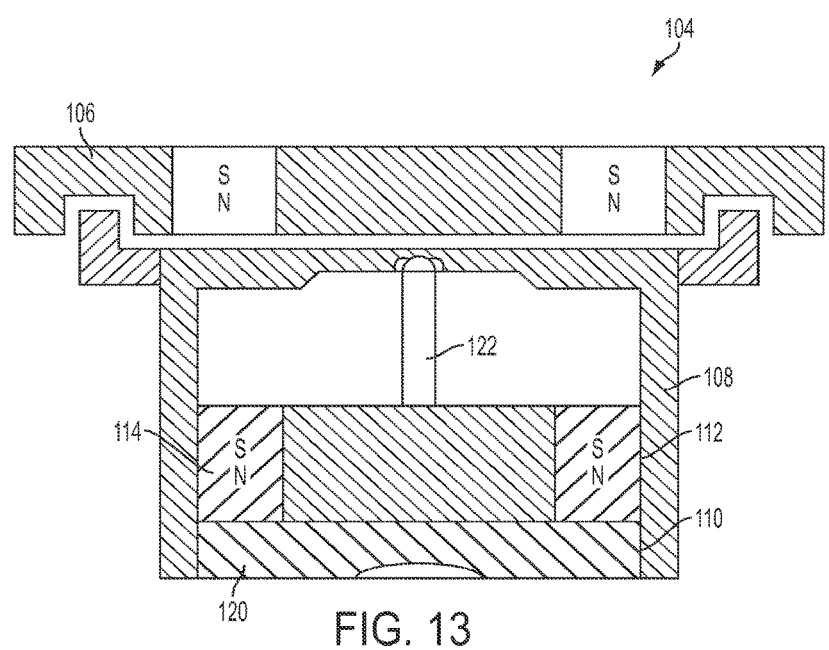
FIG. 13 illustrates a cross-sectional view of another embodiment of a magnetic actuator assembly of the eyeglass assembly of FIG. 11 along line 12-12.

FIG. 13 illustrates an alternative magnetic actuator assembly 104. Magnetic actuator assembly 104 includes actuator 106 rotatably attached to housing 108. Housing 108 includes a threaded inner surface 110 configured to engage with a threaded outer surface 112 of a plunger 114. Actuator 106 is magnetically coupled to plunger 114 via magnet 116 and 118. In another embodiment, actuator 106 can be coupled to plunger 114 via a physical connection, such as a screw, that allows for actuator 106 to transmit rotational movement to plunger 114 while also allowing for axial movement of plunger 114 relative to housing 108. In operation, as actuator 106 is rotated, plunger 114 is likewise rotated and advanced along threaded outer surface 112. As a result, plunger 114 can push fluid 120 into or pull fluid 120 out of a fluid lens module (not shown). In an embodiment, plunger 114 can be attached to a pin 122 attached to housing 108 for additional support.

Flexible Pusher Actuator Embodiments

Figure 14:
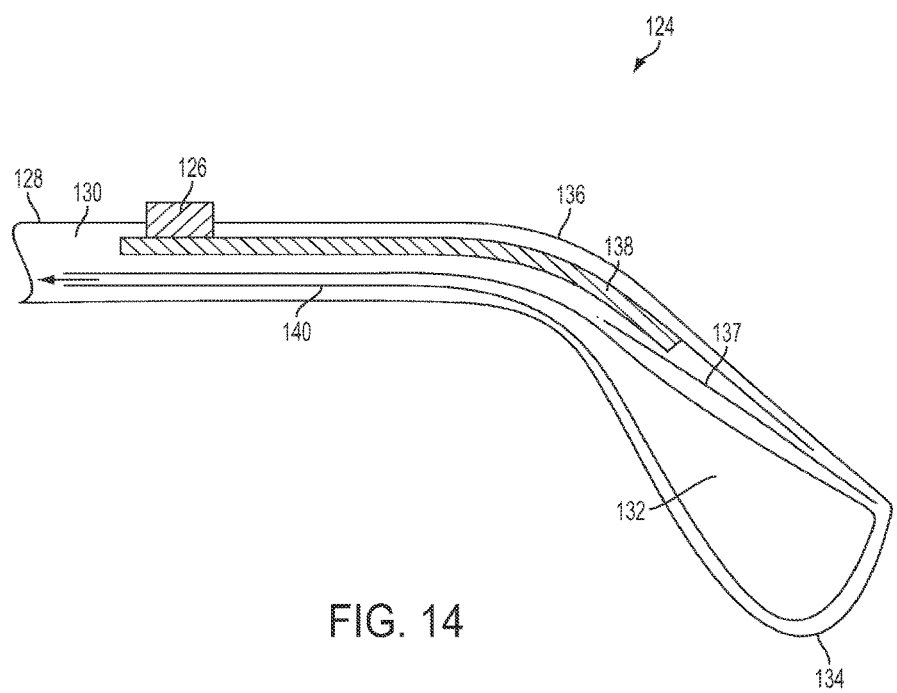
FIG. 14 illustrates a cross-sectional view of an embodiment of an actuation system in a first configuration.

FIG. 14 illustrates a cross-sectional view of an actuation system 124 in accordance with another embodiment of the invention in a first, uncompressed, configuration. Actuation system 124 includes a slider 126 slidably coupled to a temple piece 128. Temple piece 128 includes a hollow center 130 that houses a flexible pusher 138 attached to the slider, and a reservoir 132 located near a distal end 134 of temple piece 128. Actuation system 124 can additionally include a plate 137 configured to engage with pusher 138 to provide a desired pressure gradient over reservoir 132.

Reservoir 132 can also be made of a flexible, transparent, water impermeable material. For example and without limitation, the reservoir can be made of Polyvinyledene Difluoride, such as Heat-shrink VITON®, supplied by DuPont Performance Elastomers LLC of Wilmington, Del., DERAY-KYF 190 manufactured by DSG-CANLUSA of Meckenheim, Germany (flexible), RW-175 manufactured by Tyco Electronics Corp. of Berwyn, Pa. (formerly Raychem Corp.) (semi rigid), or any other suitable material. Additional embodiments of reservoirs are described in U.S. Publication No. 2011-0102735, which is incorporated herein by reference in its entirety.

Temple piece 128 further includes one or more bends 136 to contour a distal portion of temple piece 128 around a portion of the user's ear. Such contouring can minimize the likelihood of temple piece 128 slipping off a user's ear. In other embodiments, bend 136 can be located at other suitable areas within temple piece 128. In operation, as slider 126 moves relative to temple piece 128, a flexible pusher 138 attached to slider 126 curves around bend 136 in order to deform reservoir 132, which then pushes fluid (not shown) through a tube 140 towards a fluid lens module (not shown) in order to change the optical power of the fluid lens module.

Tube 140 can be made of one or more materials such as TYGON (polyvinyl chloride), PVDF (Polyvinyledene fluoride), and natural rubber. For example, PVDF may be suitable based on its durability, permeability, and resistance to crimping. In an embodiment, tube 140 can fit over an end of temple piece 128 to create a flush juncture there between. Tube 140 can further act as a hinge for an eyeglass assembly in addition to providing a conduit for fluid to flow between actuation system 124 and fluid lens module (not shown).

Figure 15:
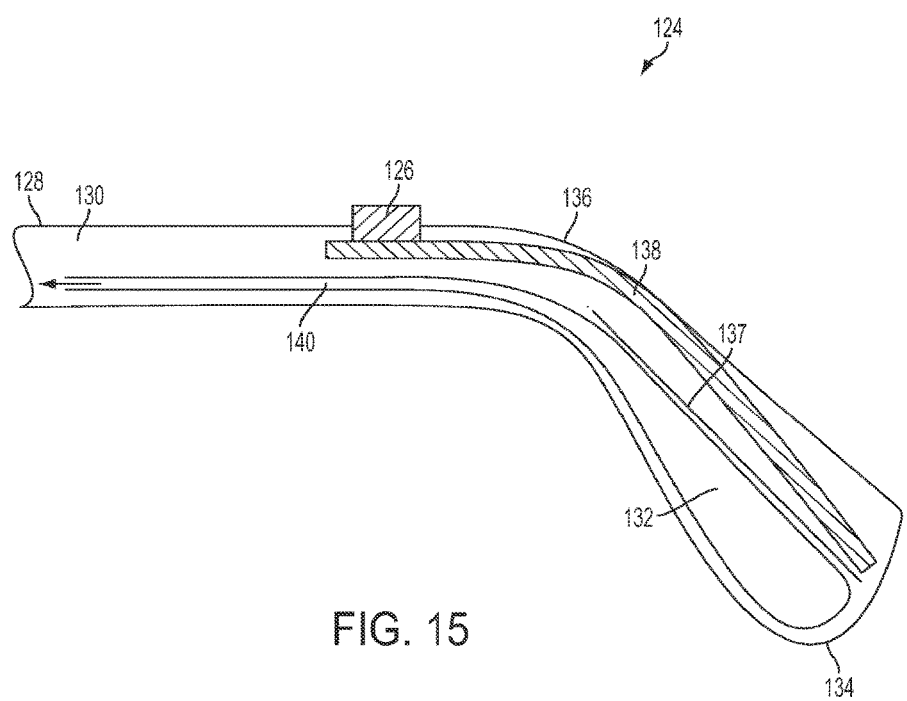
FIG. 15 illustrates a cross-sectional view of the actuation system of FIG. 14 in a second configuration.

FIG. 15 illustrates a cross-sectional view of actuation system 124 in a second, compressed, configuration, wherein flexible pusher 138 is extended towards distal end 134 of temple piece 128.

Wheel Actuator Embodiments

Figure 16:
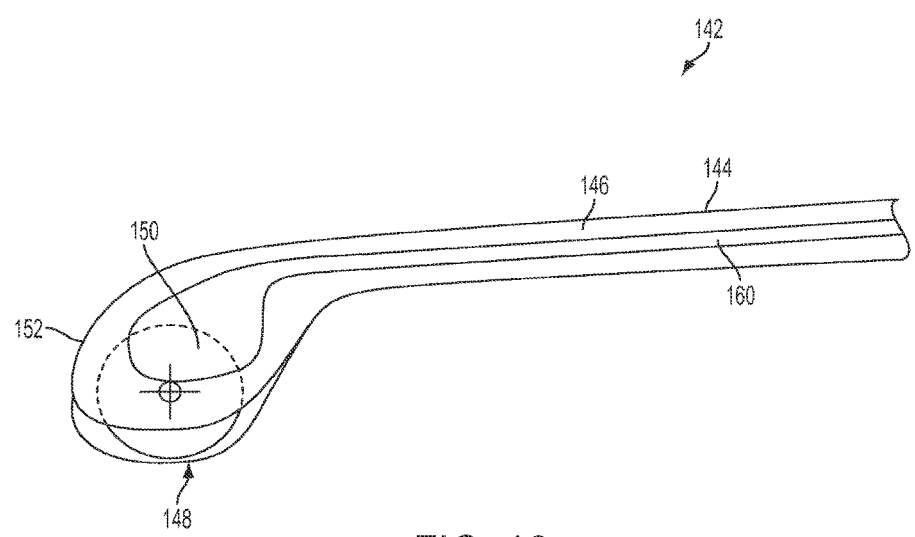
FIG. 16 illustrates a partially transparent view of an embodiment of an actuation system.
Figure 17:
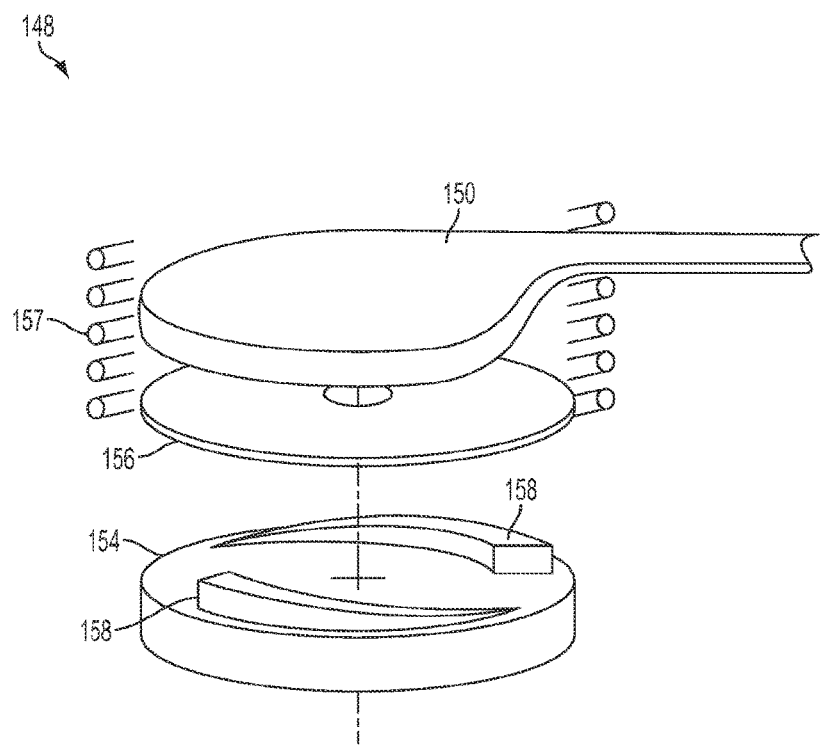
FIG. 17 illustrates an exploded view of a wheel assembly of the actuation system of FIG. 16.

FIG. 16 illustrates a partially transparent view of an actuation system 142 in accordance with another embodiment of the invention. Actuation system 142 includes a temple piece 144 having a hollow center 146. Hollow center 146 serves to house a wheel assembly 148 and a reservoir 150 located on a distal end 152 of temple piece 144. FIG. 17 illustrates an exploded view of wheel assembly 148 and reservoir 150. Wheel assembly 148 includes a wheel 154, compression disk 156, and spring 157 which can be used to bias compression disk 156 towards a predetermined location.

Wheel 154 includes one or more protrusions 158 located on an axial face of wheel 154 to move compression disk 156 in an axial direction against reservoir 150 when wheel 154 is rotated. For example protrusions 158 can be in the form of a continuous sloped surface such that rotation of wheel 154 results in smooth continuous axial movement of compression disk 156. Alternatively, wheel 154 can include discrete protrusions that serve to move compression disk 156 in discrete increments. As compression disk 156 is moved in a first axial direction, it deforms reservoir 150. As reservoir 150 deforms, it pushes fluid (not shown) through a tube 160 towards a fluid lens module (not shown) in order to change the optical power of the fluid lens module. In an embodiment, wheel assembly 148 does not include a compression disk 156 and protrusions 158 contact reservoir 150 directly.

Foldable Reservoir Embodiments

Figure 18:
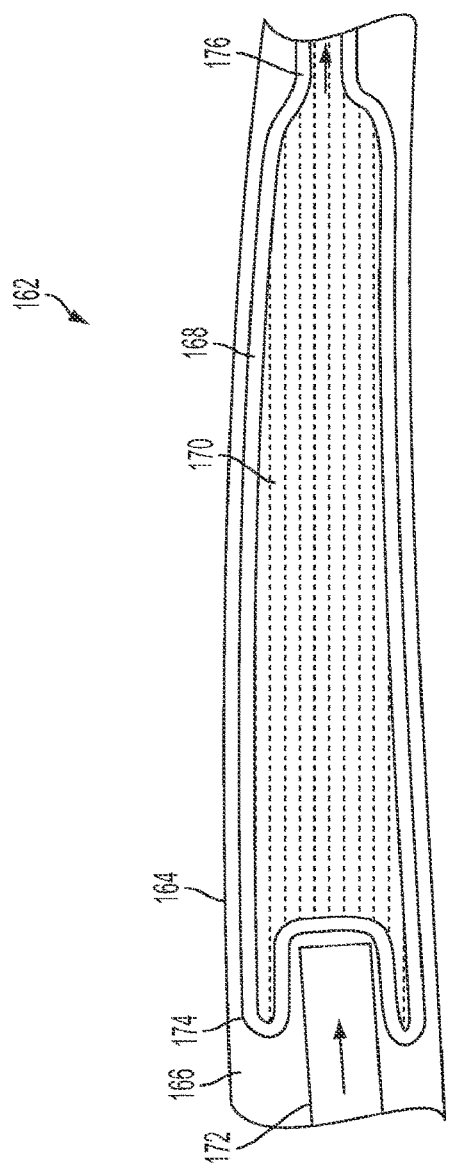
FIG. 18 illustrates a cross-sectional view of an embodiment of an actuation system in a first configuration.

FIG. 18 illustrates a cross sectional view of an actuation system 162 in accordance with another embodiment of the invention in a first compressed position. Actuation system 162 includes a temple piece 164 having a hollow center 166. Hollow center 166 serves to house a reservoir 168 filled with fluid 170 and a pusher 172.

Pusher 172 can be moved axially relative to temple piece 164 such that when pusher 172 is moved against reservoir 168, reservoir 168 folds 174 over itself to envelop the pusher. As reservoir 168 deforms, it pushes fluid 170 through a tube 176 towards a fluid lens module (not shown) in order to change the optical power of the fluid lens module. In an embodiment, pusher 172 is substantially cylindrical. In other embodiments, pusher 172 has a substantially oval cross-section. In an embodiment, pusher 172 is affixed to a portion of reservoir 168 and configured such that the portion of the reservoir affixed to the pusher will move with the pusher when the pusher is moved away from the reservoir.

Figure 19:
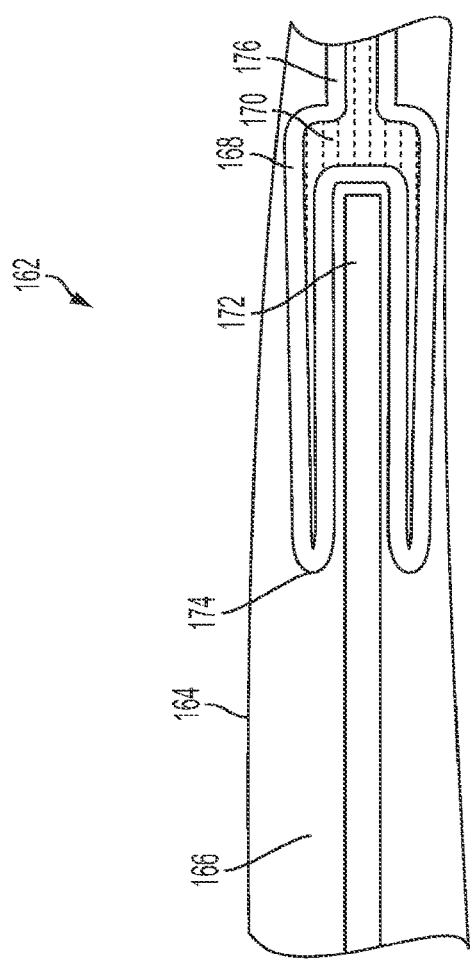
FIG. 19 illustrates a cross-sectional view of an embodiment of the actuation system of FIG. 18 in a second configuration.

FIG. 19 illustrates a cross sectional view of actuation system 162 in a second compressed position wherein pusher 172 is extended further into reservoir 168.

Pump Actuator Embodiments

Figure 20:
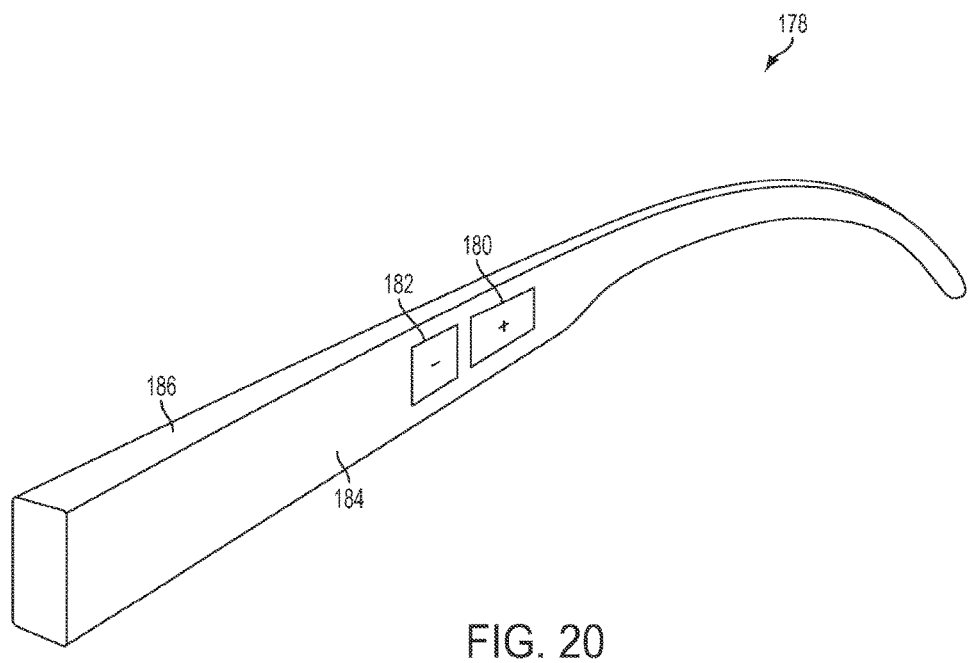
FIG. 20 illustrates a perspective view of an embodiment of an actuation system.
Figure 21:
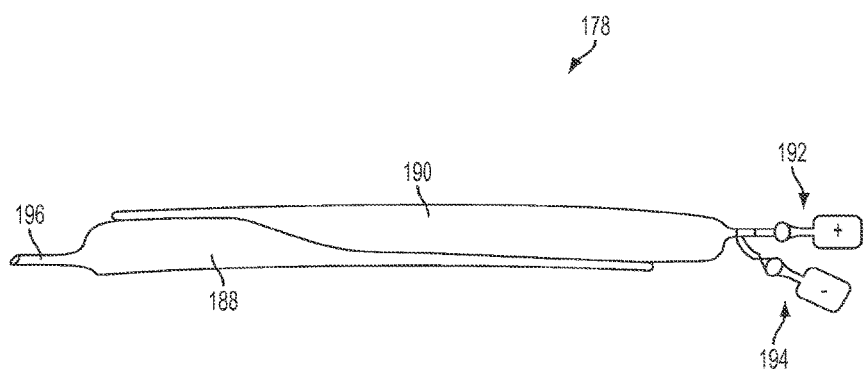
FIG. 21 illustrates a portion of the actuation system of FIG. 20.

FIGS. 20 and 21 illustrate an actuation system 178 in accordance with another embodiment of the invention. FIG. 20 illustrates a perspective view of actuation system 178 and FIG. 21 illustrates a portion of actuation system 178. Actuation system 178 includes a first button 180 and second button 182 located on face 184 of temple piece 186. In the embodiment shown in FIG. 20, buttons 180 and 182 are shown on an outer face of temple piece 186. In other embodiments, buttons 180 and 182 are located other surfaces of temple piece 186, such as the top, bottom, or inside surface. Temple piece 186 includes a hollow center (not shown) which houses a reservoir 188, a balloon 190, a pump 192, and a pressure relief valve 194. In operation, a user can repeatedly depress pump 192 using button 180 to inflate balloon 190, and depress pressure relief valve 194 using button 182 to deflate balloon 190. When balloon 190 is inflated, it deforms reservoir 188. As reservoir 188 deforms, it pushes fluid (not shown) through tube 196 towards a fluid lens module (not shown) in order to change the optical power of the fluid lens module.

Figure 22:
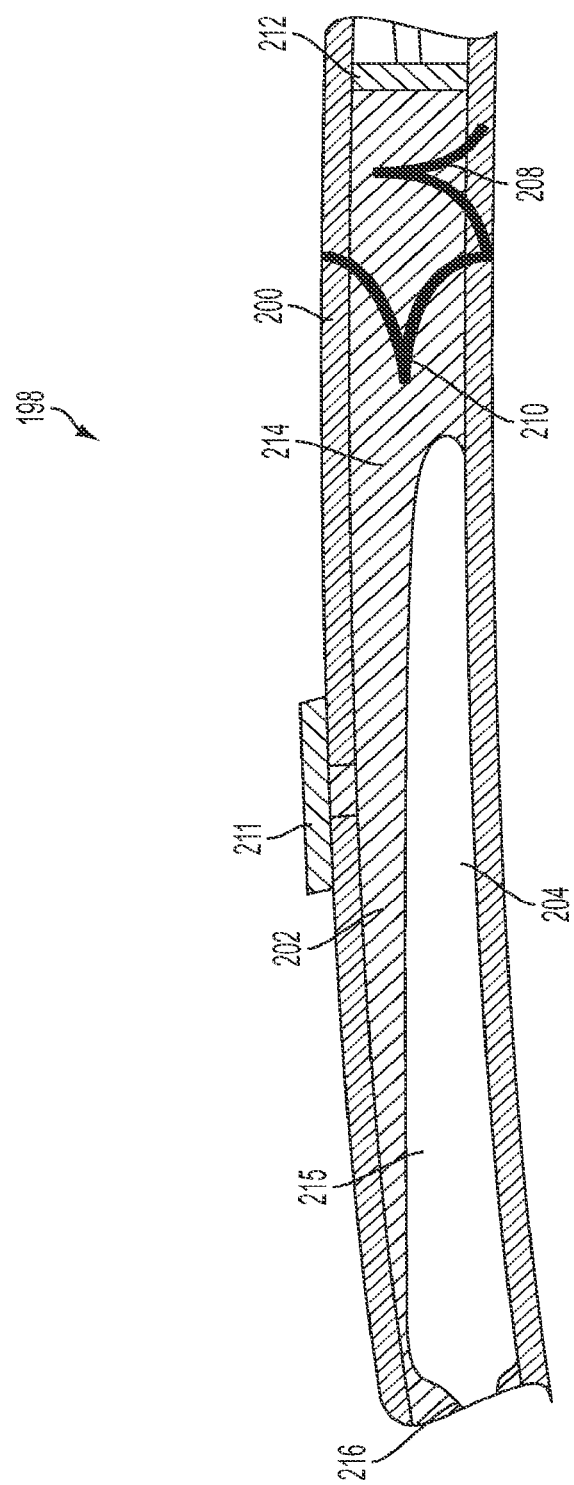
FIG. 22 illustrates a cross-sectional view of an embodiment of an actuation system.

FIG. 22 illustrates an actuation system 198 in accordance with another embodiment of the invention. Actuation system 198 includes a temple piece (or arm) 200 having a hollow center 202. Hollow center 202 houses a reservoir 204, a pressure relief valve 211, a first duckbill valve 210, a second duckbill valve 208, and a piston 212. Piston 212 is slidably disposed in temple piece (or arm) 200 to allow for movement of piston 212 in an axial direction. When piston 212 is moved towards reservoir 204, piston 212 pushes air 214 through first duckbill valve 210 to deform reservoir 204. As reservoir 204 deforms, it pushes fluid 215 through a tube 216 connected to reservoir 204 towards a fluid lens module (not shown) in order to change the optical power of the fluid lens module. First duckbill valve 210 is configured to allow pressurized air to pass through (from right-to-left as shown in FIG. 22) while preventing undesirable backflow (left-to-right flow). Additional duckbill valves, such as second duckbill valve 208 can additionally or alternatively be used to pressurize hollow center 202. Actuation system 198 further includes a pressure relief valve 211 configured to reduce the pressure in hollow center 202.

Septum Lens Embodiment

Figure 23:
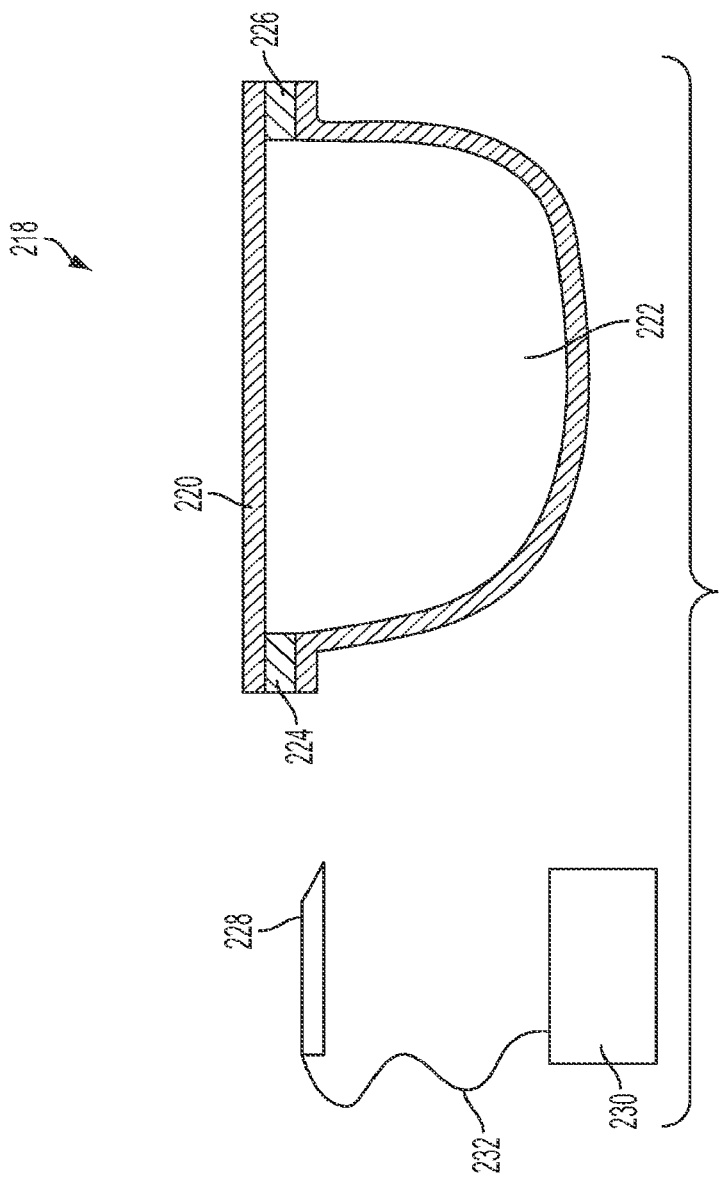
FIG. 23 illustrates a front view of a fluid lens module.

FIG. 23 illustrates a fluid lens module 218 in accordance with another embodiment of the invention. Fluid lens module 218 includes a frame 220 surrounding a fluid chamber 222. Fluid lens module 218 additionally includes a first septum 224 and second septum 226 disposed within frame 220 and sealing fluid chamber 222. In some embodiments, one or both of septa 224 and 226 are configured to be pierceable by a needle 228, such as a hypodermic needle to inject or withdraw fluid from fluid chamber 222. Once needle 228 is removed from the septum, septum 224 is configured to seal itself closed to prevent leakage of fluid from fluid chamber 222. In an embodiment, septum 224 is flush with an outside surface of frame 220.

In an embodiment, the septa are rubber stoppers used to provide an air-tight seal for fluid chamber 222. In this embodiment, after piercing with the needle, the rubber stopper closes the puncture, providing air and moisture-tight seal to protect the contents of the fluid chamber. The embodiment shown in FIG. 23 includes two septa on opposite sides of fluid chamber 222. In other embodiments, fluid lens module 218 can include only a single septum. Additionally, in other embodiments, fluid lens module 218 can include multiple septa in different locations or orientations. As shown in FIG. 23, needle 228 can be connected to a reservoir 230 via tubing 232. In other embodiments, needle 228 can be attached directly to reservoir 230 in the form of a syringe.

Thermo Fluid Lens Module Embodiments

Figure 24:
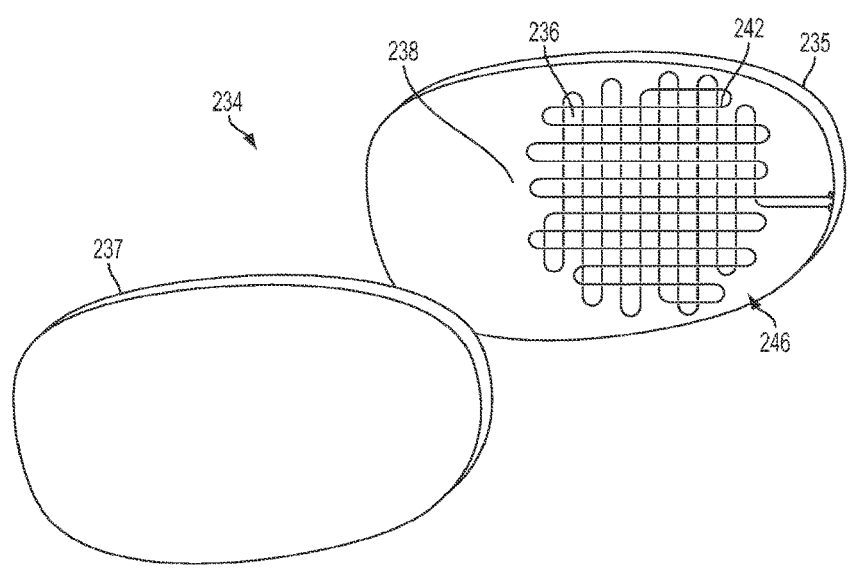
FIG. 24 illustrates an exploded view of another fluid lens module.
Figure 25:
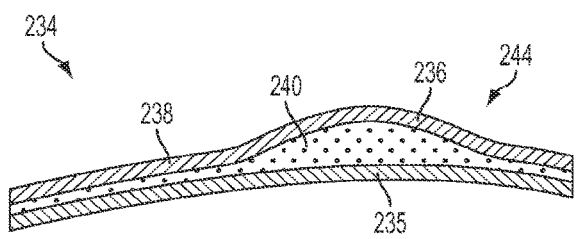
FIG. 25 illustrates a cross-sectional view of a portion of the fluid lens module of FIG. 24 in an expanded state.

FIGS. 24 and 25 illustrate a thermo-fluid lens module 234 in accordance with another embodiment of the invention. FIG. 24 illustrates an exploded view of thermo-fluid lens module 234 and FIG. 25 illustrates a cross-sectional view of a portion of thermo-fluid lens module 234 in an expanded state. Fluid lens module 234 includes a thermal element 236 disposed on a membrane 238 sealing fluid 240 against a first rigid lens 235 within a fluid chamber 244. A second rigid lens 237 can enclose membrane 238. When thermal element 236 is heated, the heat causes fluid 240 to expand and deform the shape of membrane 238. As the shape of membrane 238 is deformed, the optical power of fluid lens module 234 is changed.

In one embodiment, thermal element 236 is a single strand of electrically conductive wire 242. In this embodiment, a current is passed through wire 242. As the current passes through wire 242, wire 242 heats up in order to expand fluid 240. In one embodiment, a power source for providing a current, such as a battery, can be located in a frame or temple piece of an eyeglass assembly including the fluid lens module (not shown). In an embodiment, wire 242 is arranged in a lattice shape 246 by criss-crossing the wire to create a grid-like appearance. In an embodiment, membrane 238 is configured to deform into predetermined shapes corresponding to one or more desired optical powers. Membrane 238 can be configured to retain its deformed shape without requiring constant heat from thermal element 236 or can alternatively be configured to return to a predetermined shape after thermal element 236 cools down.

In one embodiment, thermal element 236 can be configured to provide a temperature gradient for deforming membrane 238 into a desired shape. For example, wire 242 can include areas of increased or reduced thickness so that more or less heat can be applied to a specific area of membrane 238. Lattice 246 can additionally be formed into a specific pattern to achieve a desired temperature gradient. For example, the rows and columns forming lattice 246 can be formed closer together near the center of lattice 246.

In another embodiment, thermal element 236 can include a series of cells that can independently be heated or otherwise activated via an electric current to deform membrane 238. In this embodiment, fluid 240 can be a conventional silicone oil. Alternatively, fluid 240 can be a ferrofluid exhibiting a magnetic attraction to an activated cell within thermal element 236 in order to deform membrane 238 into a desired shape.

In another embodiment, thermal element 236 can incorporate one or more electrical components, such as diodes, triodes, and transistors in order to allow for greater control of the temperature gradient over fluid lens module 234. The thermal element 236 described herein can be made small enough, for example out of micromaterials or nanomaterials, that its appearance on the user's eye when the user is wearing fluid lens module 234 is unascertainable.

The choice of materials for each of the pieces in the embodiments of the assemblies described herein can be informed by the requirements of mechanical properties, temperature sensitivity, optical properties such as dispersion, moldability properties, or any other factor apparent to a person having ordinary skill in the art. For example, the pieces of the various assemblies described can be manufactured through any suitable process, such as metal injection molding (MIM), cast, machining, plastic injection molding, and the like. The assemblies can be any suitable shape, and may be made of plastic, metal, or any other suitable material. In some embodiments, lightweight material can be used such as, for example and without limitation, high impact resistant plastics material, aluminum, titanium, or the like. In an embodiment, one or more of the parts can be made entirely or partly of a transparent material.

The foregoing-described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An actuator assembly for an adjustable fluid-filled lens, the actuator assembly comprising:
    a fluid lens module;
    a temple piece including a hollow center having a bend therein;
    a reservoir disposed within the hollow center and fluidly connected to the fluid lens module; and
    a flexible pusher disposed within the hollow center,
    wherein the flexible pusher is configured to flex at the bend to compress the reservoir, and
    wherein the reservoir is configured such that compression of the reservoir changes the optical power of the fluid-filled lens.

2. The actuator assembly of claim 1, wherein the bend is configured to contour a distal portion of the temple piece around a portion of a user's ear.

3. An actuator assembly for an adjustable fluid-filled lens, the actuator assembly comprising:
    a fluid lens module;
    a temple piece having a hollow center;
    a reservoir fluidly connected to the fluid lens module; and
    a pusher slidably disposed within the hollow center,
    wherein the pusher is configured to move in an axial direction relative to the temple piece to deform the reservoir and adjust the optical power of the fluid lens module, and
    wherein the reservoir is configured to envelop the pusher as the pusher is moved against the reservoir.

4. The actuator assembly of claim 3, wherein the hollow portion of the temple piece and the pusher are substantially cylindrical.

5. The actuator assembly of claim 3, wherein the pusher is affixed to a portion of the reservoir and configured such that the portion of the reservoir affixed to the pusher will move with the pusher when the pusher is moved away from the reservoir.

* * * * *